(12) United States Patent
Harrington et al.

(10) Patent No.: US 8,642,227 B2
(45) Date of Patent: Feb. 4, 2014

(54) FUEL CELL STACK FLOW HOOD

(75) Inventors: Matthew Harrington, West Sussex (GB); Paul Barnard, West Sussex (GB); Robert Leah, West Sussex (GB); Robert Morgan, West Sussex (GB)

(73) Assignee: Ceres Intellectual Property Company, Crawiey, West Sussex (GB)

( * ) Notice: Subject to any disclaimer, the term of this patent is extended or adjusted under 35 U.S.C. 154(b) by 848 days.

(21) Appl. No.: 12/528,510

(22) PCT Filed: Feb. 27, 2008

(86) PCT No.: PCT/GB2008/000645
§ 371 (c)(1),
(2), (4) Date: Nov. 20, 2009

(87) PCT Pub. No.: WO2008/104760
PCT Pub. Date: Apr. 9, 2008

(65) Prior Publication Data
US 2010/0143814 A1    Jun. 10, 2010

Related U.S. Application Data

(60) Provisional application No. 60/891,773, filed on Feb. 27, 2007.

(30) Foreign Application Priority Data

Feb. 27, 2007    (GB) .................................. 0703762.5

(51) Int. Cl.
*H01M 10/14*    (2006.01)
*H01M 8/24*    (2006.01)
*H01M 2/38*    (2006.01)

(52) U.S. Cl.
USPC .............................. 429/458; 29/730; 429/457

(58) Field of Classification Search
USPC ...................................... 29/730; 429/452, 458
See application file for complete search history.

(56) References Cited

U.S. PATENT DOCUMENTS

| | | |
|---|---|---|
| 5,340,664 A | 8/1994 | Hartvigsen |
| 5,840,437 A | 11/1998 | Diethelm |
| 5,998,053 A | 12/1999 | Diethelm |
| 6,440,596 B1 | 8/2002 | Ruhl et al. |
| 7,169,489 B2 * | 1/2007 | Redmond ...................... 429/515 |
| 7,722,685 B2 * | 5/2010 | Stelter ......................... 29/623.3 |
| 2001/0009732 A1 | 7/2001 | Schuler |
| 2003/0235725 A1 | 12/2003 | Haltiner, Jr. et al. |
| 2003/0235726 A1 | 12/2003 | Kelly et al. |

(Continued)

FOREIGN PATENT DOCUMENTS

| | | |
|---|---|---|
| CA | 2538659 A1 | 9/2006 |
| EP | 0 141 571 A2 | 5/1985 |

(Continued)

OTHER PUBLICATIONS

English translation of EP0377151, Bossel, Ulf. Jul. 11, 1990.*

(Continued)

*Primary Examiner* — Sonya Mazumdar
(74) *Attorney, Agent, or Firm* — Brinks Gilson & Lione

(57) ABSTRACT

The present invention is concerned with improved fuel cell stack assemblies, and methods of operation of a fuel cell stack assembly, particularly with improved gas flow and thermal management.

13 Claims, 8 Drawing Sheets

(56) References Cited

U.S. PATENT DOCUMENTS

| | | |
|---|---|---|
| 2003/0235727 A1 | 12/2003 | Noetzel et al. |
| 2003/0235751 A1 | 12/2003 | Kelly et al. |
| 2004/0043267 A1 | 3/2004 | Schuler et al. |
| 2004/0081872 A1 | 4/2004 | Herman et al. |
| 2004/0163800 A1 | 8/2004 | Richardson |
| 2005/0014046 A1 | 1/2005 | Tachtler et al. |
| 2005/0089731 A1 | 4/2005 | Ogiwara et al. |
| 2005/0092005 A1* | 5/2005 | Wunderlich et al. ............ 62/244 |
| 2005/0103479 A1 | 5/2005 | Richardson |
| 2006/0204796 A1 | 9/2006 | Potnis |
| 2006/0257696 A1 | 11/2006 | Sridhar et al. |
| 2007/0048589 A1* | 3/2007 | Koripella et al. ............... 429/38 |
| 2007/0277367 A1* | 12/2007 | Stelter ......................... 29/623.2 |
| 2008/0118813 A1* | 5/2008 | Kawakami et al. ............. 429/38 |
| 2010/0143814 A1* | 6/2010 | Harrington et al. ........... 429/434 |

FOREIGN PATENT DOCUMENTS

| | | |
|---|---|---|
| EP | 0377151 A1 | 7/1990 |
| EP | 0654838 A1 | 5/1995 |
| EP | 0780917 A1 | 6/1997 |
| EP | 0814526 A1 | 12/1997 |
| EP | 1120845 A1 | 8/2001 |
| EP | 1411571 A2 | 4/2004 |
| EP | 1416559 A2 | 5/2004 |
| EP | 1447874 A2 | 8/2004 |
| EP | 1460367 A2 | 9/2004 |
| GB | 2405028 A | 2/2005 |
| WO | WO-01/31727 A1 | 5/2001 |
| WO | WO-2007/110587 A2 | 10/2007 |

OTHER PUBLICATIONS

English translation of EP1120845, Schuler, Alexander. Aug. 1, 2001.*

English translation of DE0377151A1; Nov. 7, 1990, Bossel.*

"International Application Serial No. PCT/GB2008/000645, International Search Report mailed Apr. 24, 2008", 3 pgs.

"International Application Serial No. PCT/GB2008/000645, Written Opinion mailed Apr. 24, 2008", 6 pgs.

* cited by examiner

FUEL CELL STACK FLOW HOOD

Related Applications

This application is a nationalization under 35 U.S.C. 371 of PCT/GB2008/000645, filed Feb. 27, 2008 and published as WO 2008/104760 A1 on Sep. 4, 2008, which claimed priority under U.S.C. 119 to United Kingdom Application No. 0703762.5, filed Feb. 27, 2007; and which claims priority under U.S.C. 119(e) to United States Application No. 60/891,773, filed Feb. 27, 2007, which applications and publication are incorporated herein by reference and made a part hereof The present invention is concerned with improved fuel cell stack assemblies, and methods of operation of a fuel cell stack assembly, particularly with improved gas flow and thermal management.

The term "fuel cell stack assembly" as used herein means an at least one fuel cell stack, each at least one fuel cell stack comprising at least one fuel cell stack layer, each at least one fuel cell stack layer comprising at least one fuel cell, fuel and oxidant inlet/outlet connections, and flow paths for fuel and oxidant stream or streams, and for used fuel and oxidant stream or streams, a fuel cell stack base plate and a hood sealingly attached to the fuel cell stack base plate. Other optional components of a fuel cell stack assembly include a fuel side seal assembly, oxidant side seal assembly, endplates and a compression system, fuel cell stack insulation, and electrical and control/monitoring connections as appropriate.

The term "fuel cell stack system assembly" as used herein means a fuel cell stack assembly together with system electronics. Other optional components include a reformer (if inlet fuel is to be reformed), a water recovery system, a steam generator unit, an at least one heat exchanger optionally involving the phase change of one of the heat exchanger streams, system electronics and system control means, thermal insulation, a start-up burner, and a tail-gas combustor.

The term "system electronics" includes the control electronics and/or any power electronics, where there can be at least one electronics board and/or unit optionally placed together or apart, in or close to the fuel cell stack assembly.

The term "system control means" includes the gas and fluid control valves and pumps, air blower unit, and safety equipment.

Fuel cell stack assemblies are operated taking inlet oxidant and fuel to generate oxidation products (herein referred to as exhaust gas streams, but also referred to as anode off-gas and cathode off-gas), heat, and electricity in the form of a DC current. Overall, fuel cell stack system assemblies can also comprise additional elements including system control means and system electronics including e.g. power electronics which transform the DC fuel cell output from a first voltage to a second voltage, and/or transform the DC fuel cell output into an AC wave form.

It is common to run fuel cell stacks with an oxidant to fuel ratio of between 1:1 and 10:1, more commonly 2:1 to 5:1 and more commonly 2.5:1 to 4:1. Thus in operation there is a greater volume of oxidant gas flowing through the fuel cell stack than fuel flowing through the fuel cell stack. The excess of oxidant gas flow is typically used to enable cooling of the fuel cell stack to occur close to the electrochemical reaction site of the fuel cell.

To those skilled in the art, it is well known that the operating efficiency of a fuel cell is related to the local temperature at the point of electrochemical reaction in the fuel cell. In the operation of a fuel cell stack assembly, an inlet gas stream is heated prior to its entering a fuel cell—if it enters the fuel cell at too low a temperature then the local temperature at the point of electrochemical reaction may be too low and the operational efficiency and power output of the fuel cell may be adversely affected. The ability to manage the temperature of a fuel cell stack has a significant effect upon the operating efficiency of the fuel cell stack and its rated power output. Substantial engineering effort is spent designing fuel cell stack and balance of plant components and control processes to ensure that the fuel cell stack maintains the correct temperature for the most effective electrochemical reaction over a range of operating conditions. Typical operating conditions include system start-up, steady state operation, dynamic load change, and system shut-down.

For example, with an intermediate-temperature solid oxide fuel cell (IT-SOFC) device, the electrochemical reaction of the fuel cell(s) of a fuel cell stack in a fuel cell stack assembly may operate most efficiently with a local fuel cell temperature between 450-650° C. The fuel cell stack operating temperature is typically between 450-650° C. For effective operation of the fuel cell stack it is desirable to heat the oxidant and fuel inlet streams to a temperature close to (e.g. within 0-20%, more preferably within 0-10%, more preferably still 0-5%, of the fuel cell stack operational temperature in ° C.) that of the operating temperature of the fuel cell stack. An example of such an IT-SOFC is a fuel cell stack incorporating at least one metal supported ceria gadolinium oxide (CGO) based electrolyte fuel cell. An example of such an IT-SOFC system may have at least one heat exchange system capable of heating the oxidant gas stream entering into the fuel cell stack to a temperature of around 480° C. For typical fuel cell system designs, the heat exchanger system exit oxidant gas stream temperature is designed to be substantially the same as the required fuel cell stack oxidant gas stream inlet temperature, such that no further heat exchange to the fuel cell inlet oxidant gas stream is required. In a typical IT-SOFC system, the heating gas for the heat exchange system may have a heat exchanger system inlet temperature of around 510° C. Due to the low thermal potential between the oxidant gas stream entering into the fuel cell stack at a temperature of around 480° C. and the heat exchange system heating gas inlet temperature of around 510° C., the heat exchanger design will necessarily be large in size and of high mass. An example of such a heat exchange system for an approximate 1 kW electric power output fuel cell system is a highly efficient but complex and costly design heat exchange unit weighing about 3.5 kg.

The heat exchange system for heating the fuel cell stack oxidant gas stream may be made up of at least two heat exchanger units. The at least two heat exchange units may use at least two fuel cell system gas streams (e.g. an anode off-gas stream and a tail-gas burner off-gas stream) as a heating fluid for the fuel cell stack oxidant gas stream.

Various heat exchange arrangements to enable heating of fuel cell stack gas inlet streams are known from the prior art e.g. U.S. Pat. Nos. 5,902,692, 6,042,956 and EP 0580918. However, such devices are complex and costly and difficult to manufacture, and in particular encounter problems with effecting sealing to prevent gas stream mixing, and have limited heat exchange surface area.

US 2005/0089731 describes a system having essential features of a solid oxide fuel cell stack combined with a pre-reformer and an integrated heat exchanger, where the integrated heat exchanger incorporates two heat exchangers and an SOFC stack off-gas combustor all enclosed in an adiabatic vessel.

The thermal energy released from the off-gas combustor is used as the heating source in the heat exchangers. The SOFC is described as being capable of operating at 750 Deg C, although an operating range of 650-850 Deg C is stated. The fuel is pre-reformed to a temperature of 300 to 600 Deg C (para [0063]). In most of the embodiments described, both the fuel and air are then heated in one or more heat exchangers by using the heat from the catalytic combustor in the integrated heat exchanger (para [0079]) or by using the combustor heat and the heat energy from the air or fuel exhausting from the fuel cell stack (para [0080]).

FIGS. 21 and 22 show a situation where the fuel gas, instead of being directly fed to the stack, is fed around the periphery of the stack to gain extra heat before entering the fuel cell stack itself. However, the specifics of this teaching are non-enabling. The fuel is fed directly from the pre-reformer at between 300 and 600 Deg C (395 Deg C—para [0125]) to the space around the fuel cell stack before the fuel enters into the fuel cell stack. The fuel cell stack requires fuel at a temperature of 650-850 Deg C, most likely around 750 Deg C. There is no description of how the fuel achieves sufficient heat energy between leaving the pre-reformer and entering the fuel cell stack. In order for a temperature rise of greater than 100 Deg C to happen, the fuel would have to dwell in the stack area void for sufficient time to gain sufficient thermal energy, and there is no suggestion or teaching of how this is achieved. Additionally, there is no explanation of how the void around the stack is structured and how the void is made gas tight to stop the gases escaping from the thermal insulation that makes up the adiabatic vessel. This is not a trivial matter as the high temperatures and the presence of explosive gases containing hydrogen makes for significant engineering challenges to ensure complete gas tightness over a wide temperature operating range—something that might not even be possible with gases over 650 Deg C in the void between the stack periphery and the adiabatic vessel thermal insulation.

In para [0105] it is stated that instead of heating the fuel on the periphery of the fuel cell stack, the air can be heated on the periphery of the fuel cell stack. It is taught that air is fed from the air blower directly to the periphery of the fuel cell stack. Again, this is non-enabling. Firstly, the air would enter the void around the periphery at close to ambient temperature and would need its temperature increasing by at least 600 Deg C. There is no suggestion or disclosure of how that is to be achieved, and if it is not achieved then the fuel cell stack will simply stop operating. The thermal shock introduced onto the surface of the fuel cell stack by introducing air of such a temperature difference would introduce severe local stresses which could lead to stack failure and/or loss of stack performance either through rapid local cooling of the active fuel cell components in that area and/or loss of gas seal integrity or ceramic material integrity.

Thus US 2005/0089731 is of relevance but is fundamentally flawed in its disclosure.

Other prior art includes U.S. Pat. Nos. 6,670,069, 6,866,954, US 2003/0235751, US 2004/0043267, US 2005/0014046, US 2005/0074659, US 2006/0204796 and US 2006/0257696.

The present invention seeks to overcome the prior art disadvantages.

According to the present invention there is provided an intermediate-temperature solid oxide fuel cell stack assembly comprising:
(i) a base plate;
(ii) a hood sealingly attached to said base plate and defining a hood volume between said base plate and said hood;
(iii) at least one intermediate-temperature solid oxide fuel cell stack mounted upon said base plate and enclosed by said hood;
(iv) at least one gas inlet into said hood volume; and
(v) a pre-heater in fluid communication with an oxidant source and said at least one gas inlet and adapted to supply oxidant from said oxidant source to said hood volume via said gas inlet, each fuel cell stack comprising at least one fuel cell stack layer, each fuel cell stack layer comprising at least one intermediate-temperature solid oxide fuel cell, each fuel cell defining an oxidant inlet end and an exhaust oxidant outlet end, said at least one fuel cell stack having:
(a) at least one open-manifolded gas inlet defining an open-manifold end of said at least one fuel cell stack; and
(b) at least one internally manifolded gas outlet, said at least one gas inlet into said hood volume being located remote from said open-manifold end of said at least one fuel cell stack such that in-use oxidant enters said hood volume through said at least one gas inlet and passes around the outside of said at least one fuel cell stack to said at least one open-manifolded gas inlet, direct heat transfer occurring between said oxidant and the external surface of said at least one fuel cell stack layer prior to entry of said oxidant into said open-manifolded gas inlet, said pre-heater being configured such that in-use oxidant from said oxidant source is heated and supplied to said hood volume via said at least one gas inlet at a temperature not more than 100° C. below the in-use operating temperature at the inlet end of the fuel cell nearest the at least one open-manifolded gas inlet (i.e. at a temperature 100° C. below or hotter than 100° C. below the in-use operating temperature at the inlet end of the fuel cell nearest the at least one open-manifolded gas inlet).

The present invention seeks to achieve a number of significant advantages by providing the oxidant to the hood volume in the specified temperature range and achieving heating in the hood volume. Firstly, it seeks to allow a significant reduction in size and mass of the pre-heater component used to heat oxidant prior to its entry into the fuel cell stack, in turn reducing the size and cost of the final product. By providing the oxidant into the hood volume remote to the open-manifold end of the at least one fuel cell stack and allowing the oxidant to cool the surface of the at least one fuel cell stack and in turn heat the oxidant, the present invention seeks to cause a significant reduction in the temperature gradient across the fuel cell stack, in turn increasing the efficiency of the fuel cell stack and reducing mechanical stress upon the fuel cell stack and increasing longevity. This is neither suggested nor disclosed by the prior art.

In contrast to the example given above for a heat exchanger system required for an approximately 1 kW electric power output fuel cell system, if the required temperature of the fuel cell stack oxidant gas stream exiting the heat exchanger system is reduced from about 480° C. to about 455° C., the increase in the thermal potential between the heat exchange fluids means that the necessary efficiency of the heat exchanger system may be substantially reduced and the complexity, cost and mass reduced accordingly. In the 1 kW electric power output fuel cell system example given above, the mass can be reduced to about 2.5 kg, an almost 30% reduction. Similarly, the physical dimensions of such a heat exchanger system can also be substantially reduced, another highly desirable feature in any fuel cell stack system assembly where space and weight is frequently at a premium.

In use, a fuel cell stack comprising at least one fuel cell generates heat, electricity and water by the electrochemical activity that occurs in the fuel cell(s). Due to the internal electrical resistance of the fuel cell stack components, there is additional heat generated as the electrical current flows through the fuel cell stack components. This means that the temperature of the fuel cell and surrounding fuel cell components increases along the gas flow path from inlet(s) to outlet(s). Thus it is often observed that the temperature at the inlet end of the fuel cell stack gas (fluid) flow path is cooler than that at the gas (fluid) outlet end. This temperature difference generates a thermal gradient along the gas flow path and results in the fuel cell stack and its components having different temperatures between the gas flow inlet and outlet ends. Thus, the external surface of the fuel cell stack can have different temperatures at its gas flow path inlet end (e.g. an open-manifold inlet end) and its outlet end (e.g. an internally manifolded outlet end).

It is desirable to minimise thermal gradients within a fuel cell stack in order to enable and optimise efficient fuel cell stack operation. Reducing the thermal gradients in the fuel cell stack, and thus in the at least one fuel cell stack layer, reduces the thermally induced mechanical stresses on the fuel cell stack components. Thus, minimising the temperature gradient across a fuel cell electrochemical active area is not only beneficial to the effectiveness and efficiency of fuel cell operation, but can also reduce system complexity, reduce overall system cost, and can result in a more reliable system.

Preferably, the pre-heater is located external to the hood volume.

Preferably, the fuel cell stack assembly does not comprise an inlet gas pre-heater or heat exchange system located within said hood volume. In particular, it is preferred that the hood and/or base plate does not comprise a heat exchange surface of a heat exchanger having an in-use cool side on the interior of the hood volume and an in-use hot side external to the hood volume and in thermal communication with a fuel cell stack assembly fluid outlet, particularly a fuel cell stack oxidant-side outlet. Most preferably, such an inlet gas pre-heater located within said hood volume is not an oxidant pre-heater.

Preferably, the pre-heater is configured such that in-use oxidant from said oxidant source is heated and supplied to said hood volume via said at least one gas inlet at a temperature not greater than 80° C., more preferably 70° C., more preferably 60° C., more preferably 50° C. below the in-use operating temperature at the inlet end of the fuel cell nearest the at least one open-manifolded gas inlet.

As will be appreciated, with the fuel cell stack assembly operating in different modes (e.g. start-up, steady state operation etc.) it is possible that the pre-heater will supply oxidant to the hood volume at a temperature greater than the in-use operating temperature at the inlet end of the fuel cell nearest the at least one open-manifolded gas inlet.

Preferably, said at least one fuel cell stack additionally comprises at least one internally manifolded fuel inlet.

Preferably, said fuel cell stack additionally comprising at least one internally manifolded exhaust fuel outlet.

In certain embodiments, the at least one internally manifolded gas outlet comprises at least one internally manifolded mixed exhaust fuel and oxidant outlet.

By "direct heat transfer" is meant that the oxidant directly contacts an external surface of the at least one fuel cell stack. In particular, this external surface can include the sides of the at least one fuel cell stack layer. The external surface can also include the sides of additional fuel cell stack components such as interconnect plates and or stack layer gaskets or non-conductive spacers.

Thus, direct heat transfer is effected from the exterior of the at least one fuel cell stack to the oxidant passing over it, and this can effect the final required heating of the oxidant prior to its entry into the at least one fuel cell stack.

The gas inlet into the hood volume is located remote from the open-manifold end of the at least one fuel cell stack.

Preferably the gas inlet into the hood volume is located at an opposite end of the at least one fuel cell stack to the open-manifold end. Where there is more than one open manifold into the at least one fuel cell stack, the gas inlet into the hood volume may be located remote and generally equidistant from the open manifolds.

In certain embodiments, the at least one gas inlet comprises a single gas inlet. In alternative embodiments, the at least one gas inlet comprises a plurality of gas inlets.

In certain embodiments, the at least one gas inlet is located in the base plate. In alternative embodiments, the at least one gas inlet is located in the hood. In alternative embodiments, gas inlets are located in both the hood and the base plate. For the various embodiments, locations and numbers of gas inlets, the fuel cell stack assembly preferably additionally comprises at least one baffle, feature or component located in fluid communication with the at least one gas inlet, to encourage a desired fluid distribution of gas entering the hood volume from the gas inlet. In particular, in embodiments where the at least one gas inlet is located in the base plate, a manifold or component may be provided to aid in-use distribution of the inlet gas flow over the whole of the hot surface of the fuel cell stack assembly, thus helping avoid any stagnant fluid flow regions in the hood volume, and also helps avoid excessive unwanted channelling of gas flow. The distribution of the inlet gas flow can be so designed to account for uneven surface temperatures of the fuel cell stack.

The hood is placed so as to enclose the at least one fuel cell stack with clearance space between the at least one fuel cell stack and the inside surface of the hood. The space between the at least one fuel cell stack, the fuel cell stack base plate and the inside surface of the hood creates a hood volume.

Preferred embodiments are shown below, and by having the gas inlet into the hood volume located remote from the open manifold end of the at least one fuel cell stack, in-use inlet gas is caused to flow around the external surface of the at least one fuel cell stack prior to reaching the open manifold end at which it can enter the at least one open-manifolded gas inlet and pass to the at least one fuel cell.

This arrangement allows for heat exchange between the at least one fuel cell stack and the inlet gas over an enlarged surface area when compared to prior art devices and thus allows the final desired temperature increase by way of a simple and convenient fuel cell stack assembly design.

In addition, since the at least one gas inlet into the hood volume is located remote from the at least one open manifold end of the at least one fuel cell stack, it will typically be located adjacent the at least one gas outlet end of the at least one fuel cell stack, which, in operation is typically the highest temperature region of the at least one fuel cell stack. The thermal potential between the oxidant entering via the oxidant inlet into the hood volume and the adjacent part of the at least one fuel cell stack will therefore be high and the rate of heat exchange will be high, meaning that heat exchange will take place at a relatively high rate. As the gas in the hood volume is heated and flows towards the cooler open manifold end of the at least one fuel cell stack, the thermal potential between the oxidant and the adjacent part of the at least one fuel cell stack will be lower and so the rate of heat exchange will be lower and less heat exchange will take place. Overall, this means that less heat exchange will occur at the cooler open manifold end of the at least one fuel cell stack and that more will occur at the hotter remote end, meaning that the temperature gradient across the fuel cell stack may be reduced.

Preferably, the at least one fuel cell stack and hood are arranged such that in-use oxidant flow from the gas inlet to the hood volume to the open-manifold end of the at least one fuel cell stack primarily occurs around the sides of the at least one fuel cell stack and not over the top of the at least one fuel cell stack.

For example, the at least one fuel cell stack and the hood can be dimensioned such that a narrow gap is defined between the top of the at least one fuel cell stack and the hood such that in-use it restricts oxidant flow across the top of the at least one fuel cell stack. Alternatively, a wall can be provided around the perimeter of the top of the at least one fuel cell stack so as to seal between it and the hood and block oxidant flow. Preferably, such a wall is thermally insulated to reduce or minimise heat transfer from the at least one fuel cell stack to the hood. Alternatively, a thermally insulating block may be provided on top of the at least one fuel cell stack between it and the hood so as to reduce or prevent oxidant flow across the top of the at least one fuel cell stack. Preferably such a thermally insulating block contacts the hood so as to effect a seal between the at least one fuel cell stack and the hood and prevent oxidant flow over the top of the fuel cell stack. Alternatively the hood may contact the top of the fuel cell stack so to effect a seal between the at least one fuel cell stack and the hood and prevent oxidant flow over the top of the fuel cell stack.

The at least one fuel cell stack preferably comprises an end-plate located at its top, and such an end-plate can be shaped and dimensioned to control oxidant flow over the top of the at least one fuel cell stack, for example by the provision of arms, fingers, walls or bodies which affect in-use fluid flow.

This can be particularly advantageous in reducing the thermal gradient between the centre and the ends of the fuel cell stack. A fuel cell stack consisting of a number of fuel cell stack layers, and thus a number of fuel cells, will operate at increased efficiency if the temperature gradient between cells along the stacked direction is minimised. To this end, reduction of heat loss from fuel cell stack end-plates at the top and bottom of the fuel cell stack has been proven to be a significant advantage. Thus minimisation of the flow of oxidant in the hood volume over the fuel cell stack end-plates will assist in this objective by reducing the amount of heat ejected from the end-plate to the hood volume oxidant. Flow over the top end-plate can be minimised by use of a physical barrier between the end-plate and the hood which can be of thermally insulating material.

In use, the fuel cell stack generates a substantial amount of heat that must be removed to enable efficient fuel cell electrochemical operation. The inlet gas entering at least one fuel cell stack performs the important role of effecting cooling within the stack. This is typically achieved by passing an excess volume of oxidant (for example having a molar volume of oxygen at least e.g. 2, 3 or 4 times that necessary for oxidation of the fuel) across the fuel cell stack. However, this in turn requires the expenditure of energy on e.g. blowers to pass the oxidant through the fuel cell stack system assembly, and so any improvement in the total heat exchange from the at least one fuel cell stack to the inlet gas, particularly oxidant, can reduce the volume of gas required to effect the required heat exchange and in turn can reduce the power consumption of the fuel cell stack system assembly. The provision of the external surface of the at least one fuel cell stack as a heat exchange surface can be further advantageous in providing for an increased amount of heat exchange to each unit volume of inlet gas and thus reducing the amount of inlet gas required.

Sealingly connecting the base of the hood to the base plate is preferably achieved by welding, brazing or gluing. Preferably, the fuel cell stack assembly additionally comprises a thermally insulating material located between the base plate and the hood. Preferably, this takes the form of a gasket, and thus a gasket can be placed between the hood and the base plate and gasket compression means applied to produce the necessary seal. Such a gasket is preferably a thermally insulating and gas-tight gasket such as a vermiculite gasket or a viton gasket. Thus, the hood can be insulated from heat transfer from the at least one fuel cell stack via the base plate.

Preferably, the hood is provided with insulating material located on at least one of its internal and external surfaces. This acts to further insulate the hood from heat transfer from the at least one fuel cell stack and also acts to reduce heat transfer from the hood to other components external to it.

In order to further enhance gas flow within the hood volume, the gas inlet into the hood volume is preferably provided with at least one baffle.

Preferably, the hood is provided with at least one baffle extending into the hood volume, the at least one baffle being shaped and dimensioned so as to control fluid flow within the hood volume. In particular, an at least one baffle can prevent fluid flow occurring over the top of the at least one fuel cell stack.

Alternatively, the hood can be provided with at least one additional surface feature such as a rib or finger to control the direction of fluid flow and/or to encourage fluid flow around the at least one fuel cell stack as opposed to over the top of the at least one fuel cell stack.

As noted above, the at least one fuel cell stack and the hood are preferably dimensioned to control fluid flow within the hood volume, preferably to encourage fluid flow to occur around the at least one fuel cell stack and not over its top.

Where the hood is manufactured as a pressed article, the draw angle can be used to define appropriate surface features in the hood to effect in-use control of fluid flow.

The at least one baffle is preferably designed so as to direct the gas flow close to the at least one fuel cell stack surface.

The fuel cell stack assembly preferably comprises at least one additional gas inlet to the hood volume positioned between the open manifolded end of the at least one fuel cell stack and the at least one gas inlet into the hood volume located remote therefrom. Such an additional at least one gas inlet can be positioned, dimensioned and shaped and its in-use gas flow controlled so as to encourage gas flow towards the open manifolded end of the at least one fuel cell stack. Additionally, the additional gas flow can be used to control and alter the gas flow rate in the hood volume and alter the temperature of the gas entering into the at least one open manifold end of the at least one fuel cell stack. For example, during shut-down of the fuel cell system, the gas entering the at least one additional gas inlet point can be significantly cooler than that entering by the at least one gas inlet point and thus this will greatly speed up the reduction in temperature of the fuel cell stack resulting in reduced system shut down time.

In order to further facilitate heat transfer from the external surface of the at least one fuel cell stack layer, additional features can be provided, including for example protrusions such as fins, fingers or arms extending from the at least one fuel cell stack layer (preferably including the at least one fuel cell), providing additional surface area across which heat exchange can take place and/or to encourage turbulence in gas flow close to the stack surface to improve heat transfer.

The clearance between the hood and the at least one fuel cell stack layer or any protrusion therefrom or surface feature therein is preferably arranged so as to enhance gas flow and thus heat transfer across the feature.

Preferably, at least one formed shape is provided on the edge of the at least one fuel cell stack layer in order to promote turbulence in gas flow.

To assist in system start-up during which system operational efficiency is sub-optimal due to low operational temperature, the hood can be provided with a heater, preferably an electrical heater, arranged such that in-use fluid (particularly gas) in the hood volume is heated by the heater, for example prior to its entering the open-manifold end of the at least one fuel cell stack, more particularly prior to its release into the hood volume. The heater is preferably mounted on the inside surface of the hood or the outside surface of the hood. The heater may be made from material similar to that used for kettle elements. Alternatively, the hood can be made from a dielectric material which heats up on application of current.

In certain embodiments, such an electrical heater takes the form of a heater element wrapped, placed or located around or contained in a gas distribution component (e.g. an oxidant inlet into the hood volume or a flow distribution device) such that in-use oxidant (e.g. air) entering into the hood volume passes over the heater element. In certain embodiments, the heater is a component part of the pre-heater.

Preferably, the internal surface of the hood is provided with a sulphur absorbing or adsorbing material to in-use remove sulphur from the oxidant prior to its entry into the at least one open-manifolded gas inlet. For example to entrap the residual sulphur for an automotive auxiliary power application the sulphur absorbing or adsorbing material can trap sulphur at levels associated with operating a fuel cell system in dirty city air.

Preferably, the internal surface of the hood is provided with a Cr adsorbing or absorbing material, for example in the form of a coating, to in-use remove any chromium species from the oxidant feed, thus reducing the possibility of Cr poisoning of the fuel cell cathode.

Preferably, the hood volume is at least partially filled with a thermally conductive mesh, network of fibres, or filler material which in-use enhances heat transfer between the at least one fuel cell stack and the gas. More preferably, such a material is electrically non-conductive. More preferably still, it is coated with at least one of a sulphur absorbing material, and a sulphur adsorbing material.

Preferably, the fuel cell stack assembly is additionally provided with an at least one gas heat exchange system external to the hood volume. More preferably, the at least one gas heat exchange system comprises a heat exchange device which is in fluid communication with the at least one internally manifolded gas outlet and in-use utilises the outlet gas flow as a heating fluid, the gas which is to be inlet into the hood volume being used as a cooling fluid. This can allow for a close special and thermal coupling of the at least one gas heat exchange system with the inlet gas and the internally manifolded gas outlet.

Preferably, to further improve the performance of the fuel cell stack, the inlet fuel is also heated prior to its entering the fuel cell stack. This is preferably achieved by passing the exhaust fuel flow along the internally manifolded fuel outlet to a gas-to-gas heat exchanger and an at least one condensing heat exchanger to remove water vapour and recover heat. The now drier exhaust fuel flow thus contains unreacted fuel gas, and the heat energy retained in the unused chemical energy is recovered by passing it to a burner where it mixes with the exhaust oxidant flow which has passed along the internally manifolded oxidant outlet and burns. This creates a high-temperature burner off-gas which is then preferably used to provide a heat source for heating the inlet fuel. In certain embodiments, this heat energy is used to support an endothermic steam reforming of the inlet fuel. The burner off-gas is then preferably passed to a steam generator unit to generate the steam required for the endothermic steam reforming before entering an optional start-up burner unit and then entering the inlet gas heat exchange system.

Where such multiple heat exchange steps are provided, it is particularly advantageous and desirable to thermally close-couple as many of them as possible. For example, providing the above heat exchange and chemical reaction units as at least one combined unit provides for a reduction in the size of the fuel cell stack system assembly. For example, a combined steam generator, fuel reformer and reformate cooler can be provided in one unit. Such a device or devices is preferably connected directly to the underside of the base plate opposite to the fuel cell stack side. Thus, gas path lengths are significantly reduced, and gas pipe connections are minimised, reducing part count and connection leakage risk and simplifying system assembly.

Preferably, the at least one fuel cell stack is a metal-supported intermediate temperature solid oxide fuel cell (IT-SOFC) stack, more preferably as taught in U.S. Pat. No. 6,794,075.

Preferably, the hood is manufactured from at least one layer of plastic, ceramic or metal or a mix of at least two of these materials, for example a plastic coated metal hood. More preferably, it is fabricated from stainless steel, for example formed by deep drawing, bending and welding, brazing, or casting. For low temperature fuel cell applications, the hood is preferably injection moulded from a suitable plastic material.

Preferably, the hood is thermally insulated on at least one of its inside and outside, more preferably on the outside. Appropriate insulating layers include but are not limited to those which are wound on or formed to match, or can be made from more than one layer and more than one insulating material.

Preferably, for an intermediate- or high-temperature fuel cell system, a multi-layer insulation is provided comprising a first relatively bulky inner layer capable of withstanding the operational temperature (for example an insulation provided by Microtherm Inc. (Tenn., USA)) and a second thinner outer layer comprising an Aspen Aerogel (RTM) (Aspen Aerogels, Inc., Mass., USA) capable of withstanding the operational conditions external to the first or inner insulating layer(s). Overall, this can provide a particular advantage of reducing the overall insulation volume whilst providing for insulation capable of withstanding temperatures outside of the operating temperature range of the outer layer insulation.

The present invention is equally applicable to fuel cell stack assemblies which use a variety of gas flow arrangements, including co-flow, counter-flow and cross-flow.

Also provided according to the present invention is a fuel cell stack system assembly comprising a fuel cell stack assembly according to the present invention.

Also provided according to the present invention is a method of operation of an intermediate-temperature solid oxide fuel cell stack assembly, said fuel cell stack assembly comprising:
(i) a base plate;
(ii) a hood sealingly attached to said base plate and defining a hood volume between said base plate and said hood;
(iii) at least one intermediate-temperature solid oxide fuel cell stack mounted upon said base plate and enclosed by said hood;
(iv) at least one gas inlet into said hood volume; and
(v) a pre-heater in fluid communication with an oxidant source and said at least one gas inlet and adapted to supply oxidant to said hood volume via said gas inlet,
each fuel cell stack comprising at least one fuel cell stack layer, each fuel cell stack layer comprising at least one intermediate-temperature solid oxide fuel cell, each fuel cell defining an oxidant inlet end and an exhaust oxidant outlet end said at least one fuel cell stack having:

(a) at least one open-manifolded gas inlet defining an open-manifold end of said at least one fuel cell stack; and
(b) at least one internally manifolded gas outlet, said at least one gas inlet into said hood volume being located remote from said open-manifold end of said at least one fuel cell stack,
comprising the steps of passing oxidant into said hood volume through said at least one gas inlet passing it around the outside of said at least one fuel cell stack to said at least one open-manifolded gas inlet, direct heat transfer occurring between said oxidant and the external surface of said at least one fuel cell stack layer prior to entry of said oxidant into said open-manifolded gas inlet, said pre-heater being configured such that in-use oxidant from said oxidant source is heated and supplied to said hood volume via said gas inlet at a temperature not greater than 100° C. below the in-use operating temperature at the inlet end of the fuel cell nearest the open-manifolded gas inlet (i.e. at a temperature 100° C. below or hotter than 100° C. below the in-use operating temperature at the inlet end of the fuel cell nearest the at least one open-manifolded gas inlet).

Preferably, the method additionally comprises the step of performing an electrochemical reaction, with oxidant and fuel upon said at least one fuel cell to generate heat and electricity.

The invention will be further apparent from the following description with reference to the several figures of the accompanying drawings which show by way of example only forms of fuel cell stack assemblies. Of the figures.

Figure 1:
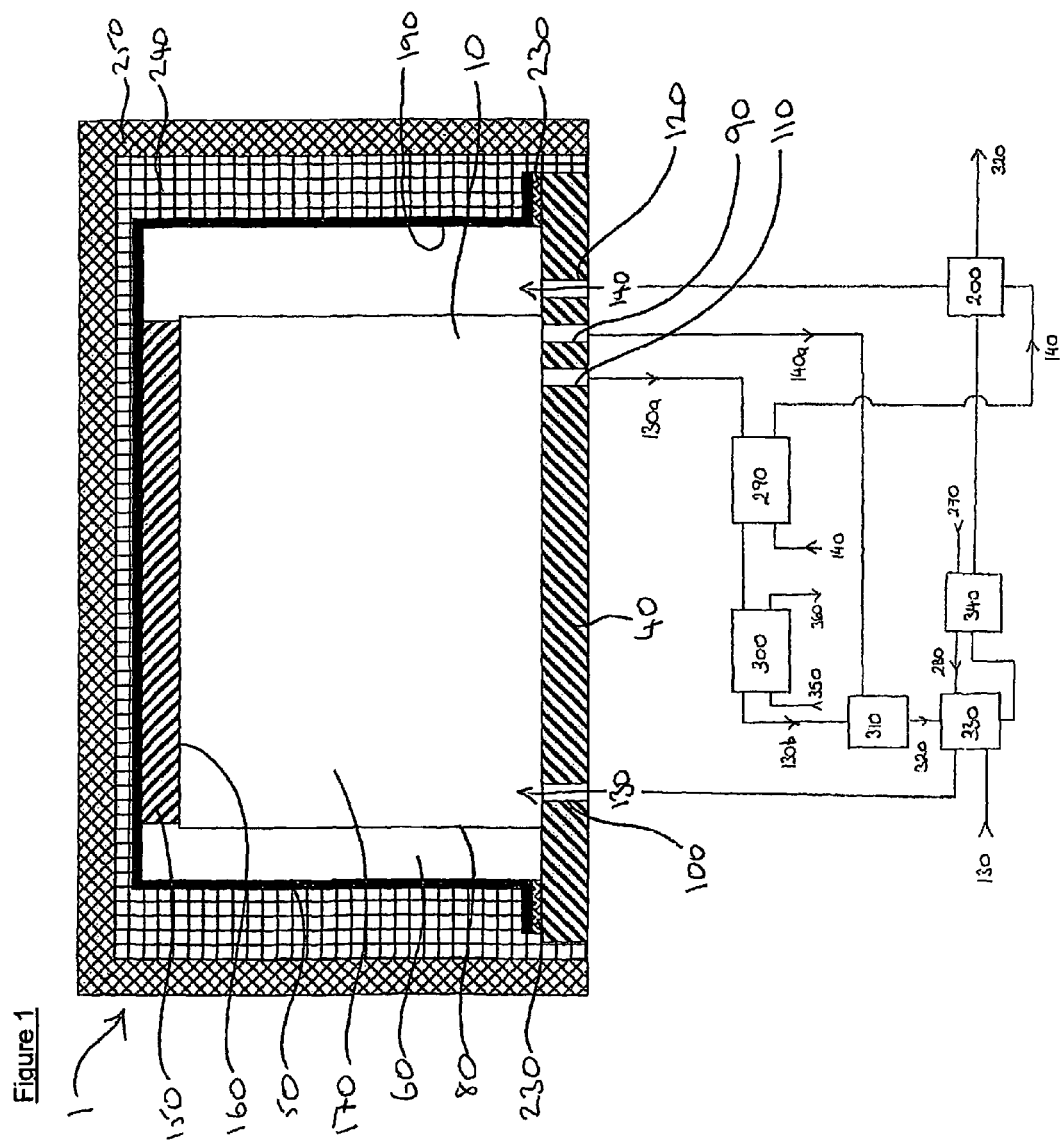
FIG. 1 shows a partial cut-away side view of a fuel cell stack assembly of the present invention.
Figure 2:
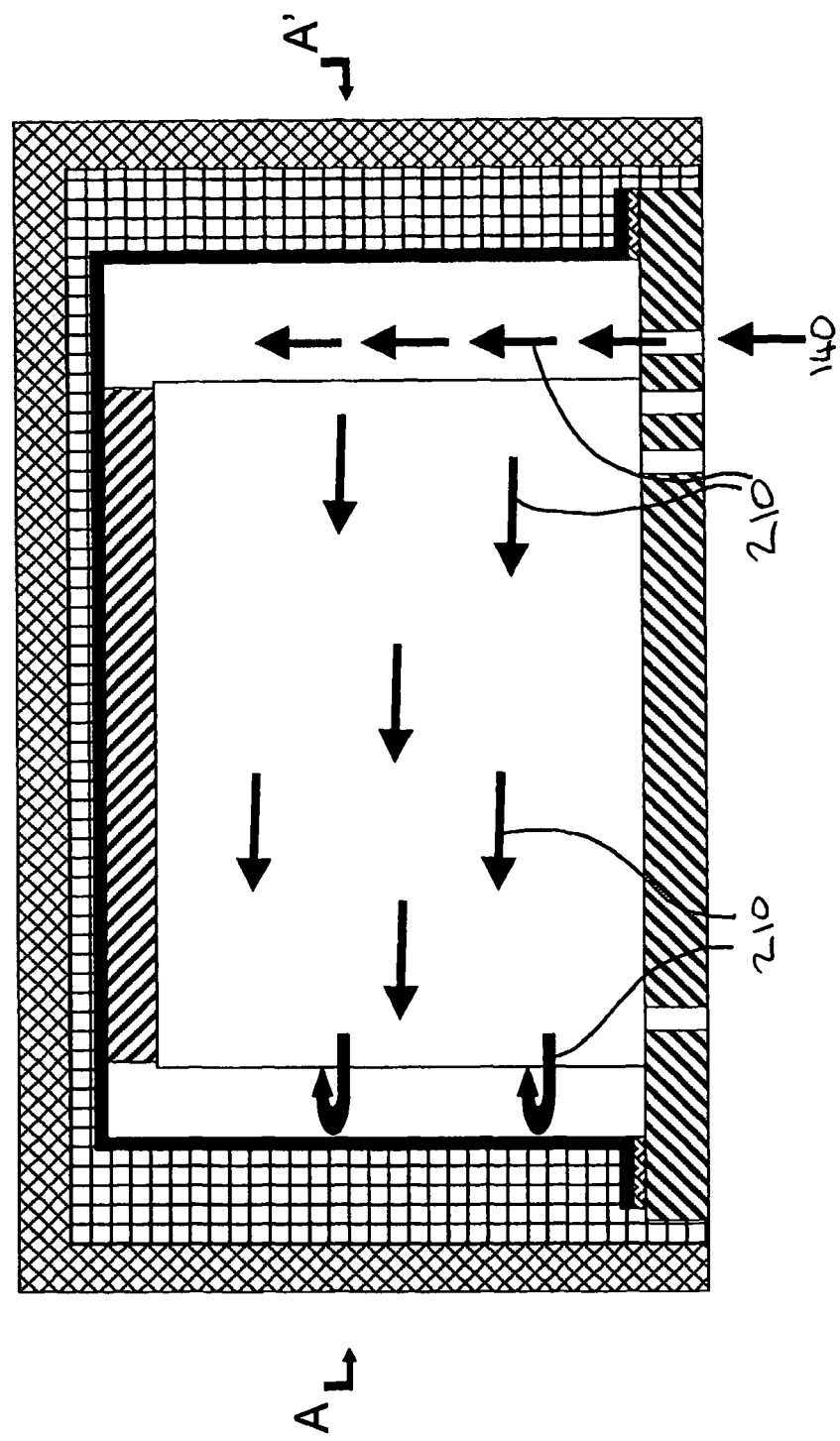
FIG. 2 shows oxidant fluid flow in the fuel cell stack assembly of FIG. 1.

Teachings of fuel cell and fuel cell stack assemblies are well known to one of ordinary skill in the art, and in particular include U.S. Pat. No. 6,794,075, WO 02/35628, WO 03/075382, WO 2004/089848, WO 2005/078843, WO 2006/079800, and WO 2006/106334, which are incorporated herein by reference in their entirety.

In a first embodiment of a fuel cell stack assembly 1, a solid oxide fuel cell stack 10 is assembled from a number of fuel cell stack layers 20, with each fuel cell stack layer 20 containing one fuel cell 30 (in other embodiments, not shown, each fuel cell stack layer 20 contains a plurality of fuel cells 30). Each fuel cell comprises an anode 31, electrolyte 32 and cathode 33 mounted on a fuel cell metal substrate 34 and covering a fuel cell substrate porous region 36 which is surrounded by a fuel cell substrate non-porous region 35. Electrically conductive interconnect plate 37 provides manifolding for fuel flow. The metal substrate 34 of a first fuel cell stack layer 20 is prevented from coming into direct electrical contact with the interconnect plate 37 of a second adjacent fuel cell stack layer by electrically insulating gasket 38.

Fuel cell stack 10 is mounted on base plate 40 and a hood 50 is placed over fuel cell stack 10 and sealingly engages base plate 40 to define hood volume 60 between base plate 40 and hood 50 and containing within it fuel cell stack 10.

Fuel cell stack 10 is provided with an open-manifolded oxidant inlet 70, Which defines open-manifold end 80 of fuel cell stack 10. Each fuel cell stack layer 20 also has an internally manifolded oxidant outlet 90 (for a fuel cell stack layer having a single fuel cell, corresponding to the exhaust oxidant outlet end of the fuel cell), together with an internally manifolded fuel inlet 100 and an internally manifolded fuel outlet 110, each of which pass through channels (not shown) in base plate 40.

Base plate 40 is additionally provided with oxidant inlet 120 into hood volume 60 located at the opposite end of fuel cell stack 10 to open-manifold end 80.

In use, fuel 130 feeds to the anode electrode side of fuel cell 30 via internally manifolded fuel inlet 100 which passes through base plate 40.

Oxidant (air) 140 enters hood volume 60 through oxidant inlet 120 at the opposite end of the fuel cell stack 10 to open-manifold end 80. A thermally insulating flow restriction device 150 is provided on top of fuel cell stack 10 end-plate 160 and is dimensioned so as to contact hood 50 and prevent airflow between end-plate 160 and hood 50. In-use, airflow thus occurs in hood volume 60 from oxidant inlet 120 along the sides of fuel cell stack 10 to open-manifold end 80, and into fuel cell stack 10. Arrows 210 indicate oxidant 140 flow.

Fuel cell stack end-plate 160 is a top end-plate, and base plate 40 acts as a bottom end-plate. Compression means are provided as appropriate to compress the at least one fuel cell stack, ensuring the necessary gas seal and electrical connections. Examples of suitable compression systems include those taught and referenced in WO 2007/085863.

External surfaces 170 of fuel cell stack 10 are provided with protrusions in the form of fins (not shown) which are shaped and dimensioned to enhance airflow over the sides of fuel cell stack 10 and to enhance heat transfer between the exterior of fuel cell stack 10 and oxidant 140.

Oxidant 140 enters hood volume 60 at an initial temperature of about 455° C. and the operational outlet temperature of fuel cell stack 10 at internally manifolded oxidant outlet 90 is about 600° C. The inlet end of the fuel cell 30 nearest open-manifolded oxidant inlet 70 is at a steady-state in-use operating temperature of about 500° C. In order to achieve an acceptable operational efficiency oxidant 140 is heated to a temperature of at least 480° C. prior to entering open-manifolded oxidant inlet 70. Heating of oxidant 140 is effected by contact and heat exchange with fuel cell stack 10 external surface and the interior surface 190 of hood 50.

In this embodiment, internally-manifolded oxidant inlet 70 comprises a discrete open manifold inlet for each fuel cell stack layer 20. In other embodiments (not shown), internally-manifolded oxidant inlet 70 comprises a plurality of open manifold inlets for each fuel cell stack layer. In still further embodiments (not shown), internally-manifolded oxidant inlet 70 comprises a single open manifold inlet for a plurality of fuel cell stack layers.

Oxidant 140 at a temperature of at least 480° C. enters open-manifolded oxidant inlet 70 and feeds to the cathode electrode side of fuel cell 30, and an electrochemical reaction takes place in which oxidant 140 reacts with the cathode and fuel 130 reacts with the anode, heat, water and electrical energy being generated. The electrical energy passes across a load on an electrical circuit (not shown).

The reacted fuel 130 then exits fuel cell 30 and fuel cell stack layer 20 via internally manifolded fuel outlet 110 at the side of fuel cell stack 10 remote to open-manifold end 80, passing through base plate 40. The reacted oxidant 140 then exits fuel cell 30 and fuel cell stack layer 20 via internally manifolded oxidant outlet 90 at the side of fuel cell stack 10 remote to open-manifold end 80, passing through base plate 40.

Thus, the side of the fuel cell stack 10 where the off-gases (oxidant 120 and fuel 130) exit the fuel cell stack 10 via internally manifolded fuel outlet 110 and internally manifolded oxidant outlet 90 will be at the highest temperature since it will be heated by the hot exhaust gases, and the open-manifold end 80 will be the coolest since it loses heat to the inlet oxidant 140 stream. Thus, the greatest thermal potential exists (and the greatest heat exchange will occur) between the external side of fuel cell stack 10 remote to open-manifold end 80 and oxidant 140 entering hood volume 60 at that point through oxidant inlet 120.

This heat exchange acts to benefit the fuel cell stack 10 since it acts to reduce the temperature gradient along the length of the fuel cell stack 10. This heat exchange also reduces the mechanical stress upon the fuel cell stack assembly 1 and allows the size and mass of pre-heater 200 to be reduced relative to what would be required if air were required to enter open-manifolded oxidant inlet 70 at a higher temperature.

Figure 5:
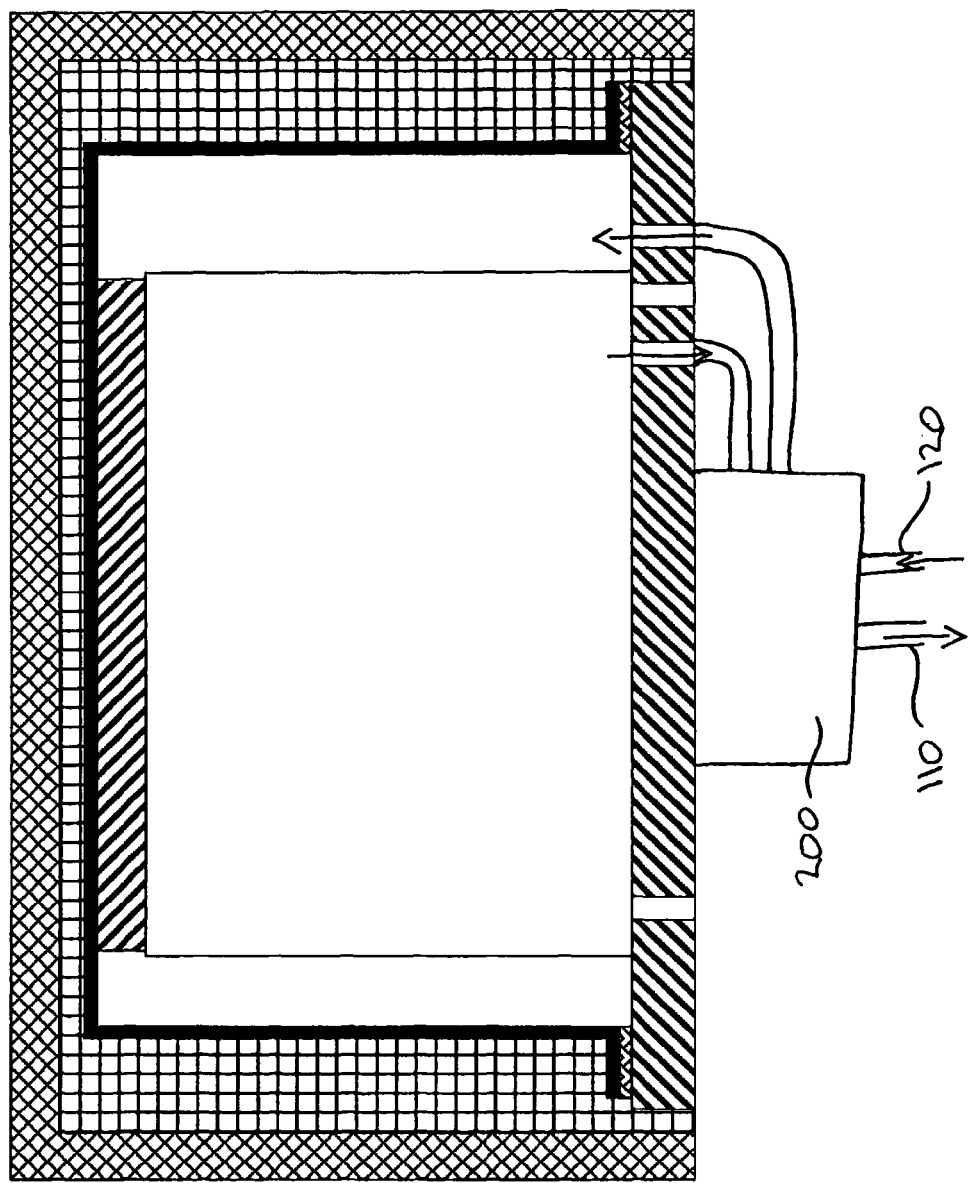
FIG. 5 is a partial cut-away side view of a further fuel cell stack assembly, additionally incorporating an oxidant heat exchange system.

As is shown in FIG. 5, fuel cell stack 10, base plate 40 and hood 50 form part of a larger fuel cell stack system assembly which includes an oxidant heat exchange system (pre-heater) 200 which raises oxidant 140 flowing through oxidant inlet 120 up to its initial inlet temperature of about 455° C., with exhausted fuel 130 flowing along internally manifolded fuel outlet 110 acting as the heating fluid. Typical prior art fuel cell stack system assembly oxidant heat exchange system had to raise oxidant to a temperature of about 480° C. prior to its entry into the fuel cell stack 10, and this reduction in thermal load upon the oxidant pre-heater means that the size, mass, cost and complexity of the oxidant heat exchange system 200 can be substantially reduced.

In order to further improve the performance of the fuel cell stack 10, the inlet fuel 130 is also heated prior to its entering fuel cell stack 10. This is achieved by passing the exhaust fuel 130a flow along internally manifolded fuel outlet 110 to a gas-to-gas heat exchanger (290) and an at least one condensing heat exchanger 300 to remove water vapour and recover heat. The drier exhaust fuel 130b flow thus contains unreacted fuel gas 130, and the heat energy retained in the unused chemical energy is recovered by passing it to a burner (310) with exhaust oxidant 140a which has flowed along internally manifolded oxidant outlet 90. The high temperature burner off-gas 320 is then used to provide a heat source for heating the inlet fuel 130. In certain embodiments this heat energy is used to support an endothermic steam reforming in reformer unit 330 of the inlet fuel 130. The burner off-gas can then be passed to a steam generator unit 340 to generate steam 280 using water supply 270, which is required for the catalytic reforming before entering an optional start-up burner unit (not shown) and then entering oxidant heat exchange system 200.

In the present embodiment, a fuel cell stack end-plate 160 has mounted between it and the underside of hood 50 a thermally insulating flow restriction device 150 which blocs fluid flow across the top of end-plate 160 and which thermally insulates hood 50 from fuel cell stack 10.

In addition, a gas sealing thermally insulating vermiculite gasket 230 is provided between the base of hood 50 and base plate 40 to further thermally insulate hood 50 from fuel cell stack 10.

Further insulation is provided for components outside of hood 50 by a relatively thick inner insulating layer 240 of a Microtherm (RTM) Freemoulding product and a relatively thin outer insulating layer 250 of Aspen Aerogel Pyrogel (RTM), which overall provide the desired thermal insulation of hood 50 whilst achieving such insulation with a reduced volume of insulating materials compared to that which would be required if the material of the inner insulating layer 240 alone were used.

Figure 3:
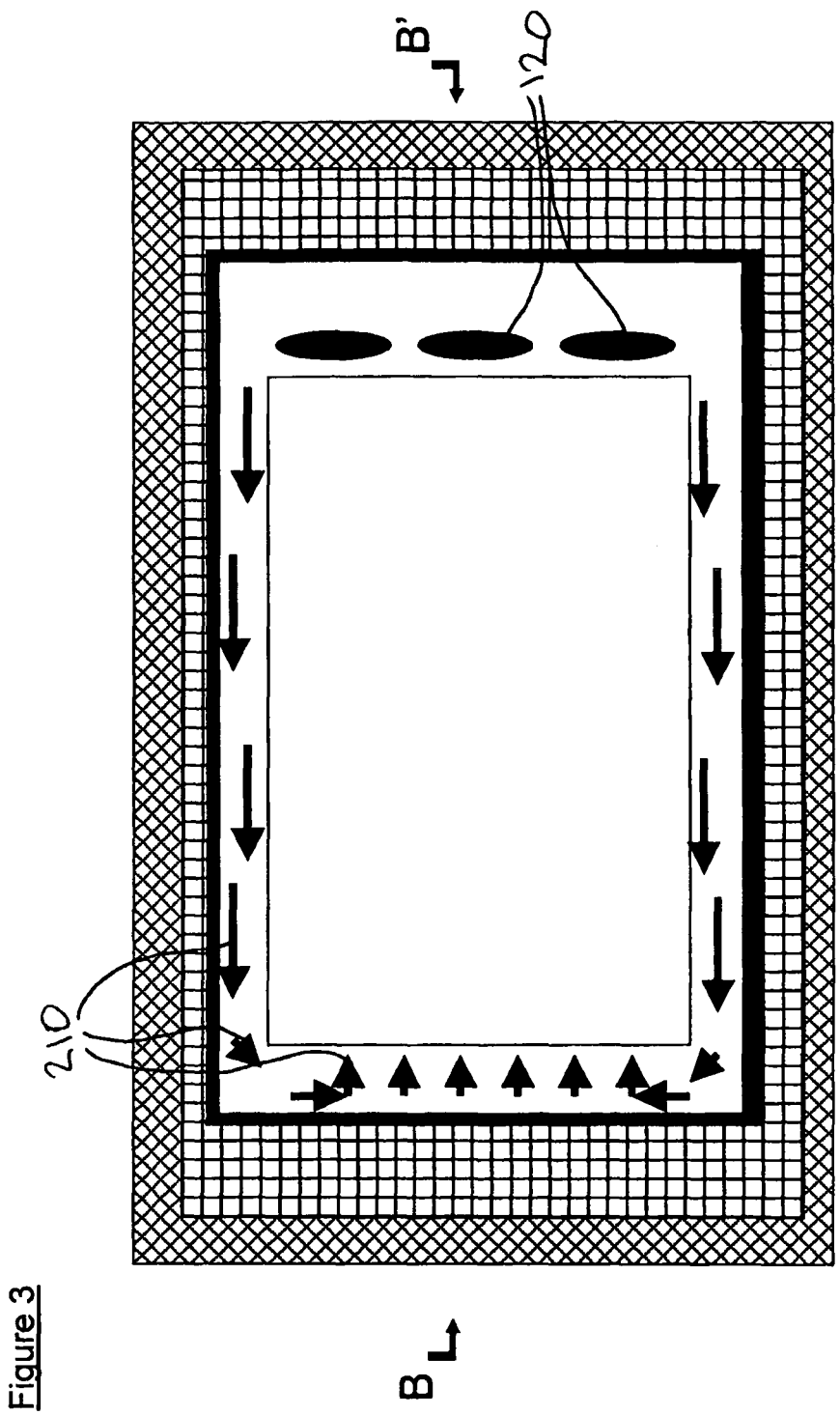
FIG. 3 is a section through lines A-A' showing oxidant fluid flow in the fuel cell stack assembly of FIG. 1.
Figure 4:
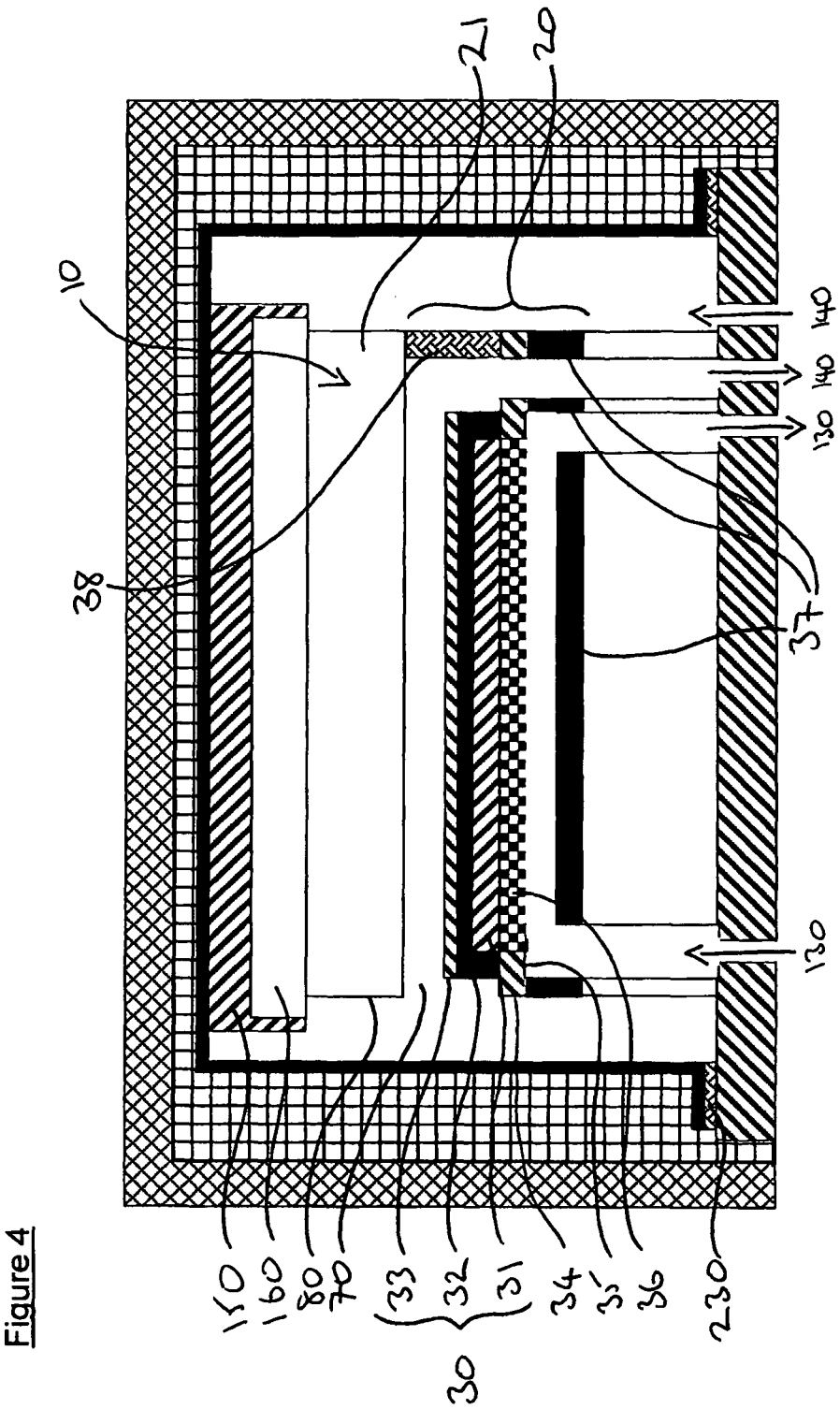
FIG. 4 is a section through lines B-B' showing a single fuel cell stack layer.

FIG. 4 shows a section through B-B' (FIG. 3) with (for illustrative purposes only) an enlarged fuel cell stack layer 20 and additional fuel cell stack layers 21. As can be seen, air 140 enters the fuel cell stack assembly 1 at oxidant inlet 120, which is located at the opposite side of fuel cell stack 10 to (i.e. remote from) open-manifolded oxidant inlet 70. Air 140 then passes around the sides of fuel cell stack 10 (fluid flow over the top of fuel cell stack 10 being blocked by gas sealing thermally insulating vermiculite gasket 150 positioned between and contacting the top surface of fuel cell stack end-plate 160 and the hood 50) and is heated and passes to open-manifolded oxidant inlet 70 of fuel cell stack layer 20 and passes over the cathode 33 of intermediate temperature solid oxide fuel cell (IT-SOFC) 30, undergoes an electrochemical reaction to generate heat, oxides and electricity, and exhausts via manifolding 90. Fuel 130 enters fuel cell stack 10 via internally manifolded fuel inlet 100, passes under fuel cell substrate porous region 36 through which it passes to fuel cell anode 31 and undergoes an electrochemical reaction to generate heat, oxides (primarily carbon oxides and water) and electricity. Exhausted fuel 130 then exits fuel cell stack 10 via internally manifolded fuel outlet 110.

Each fuel cell stack layer 20 comprises an electrically conductive interconnect plate 37 which provides manifolding and for electrical contact with adjacent fuel cell stack 10 components. Fuel cell metal substrate 34 is mounted on top of interconnect plate 37 and comprises a fuel cell substrate porous region 36 bordered by fuel cell substrate non-porous region 35. Thus, fluid flow can occur through porous region 36. On top of porous region 36 is mounted fuel cell 30. Fuel cell anode covers porous region 36, and then fuel cell electrolyte 32 extends over anode 31 and porous region 36 to prevent fluid flow from the fuel side of fuel cell 30 to the oxidant side of fuel cell 30 through porous region 36. Fuel cell cathode 33 is mounted on top of fuel cell electrolyte 32.

An electrically conductive current conductor (not shown) extends from fuel cell cathode 33 and is in electrical contact with electrically conductive interconnect plate 37 so as to form an electrical circuit, and a load is placed upon the circuit. Additional fuel cell stack layers 21 are positioned on top of fuel cell stack layer 20, and electrical shorting from fuel cell metal substrate 34 to the electrically conductive interconnect plate 37 of an adjacent fuel cell stack layer 21 is prevented by electrically insulating gasket 38 which additionally provides mechanical support for additional fuel cell stack layers 21.

Figure 6:
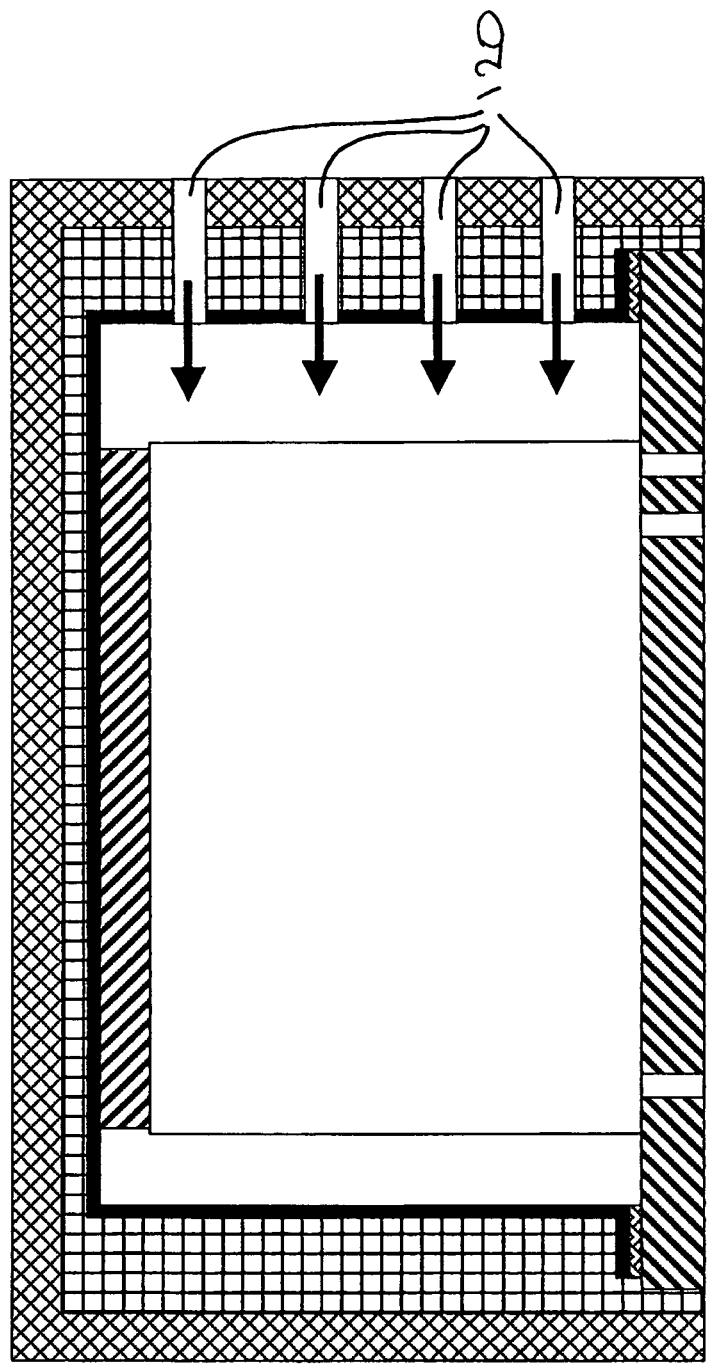
FIG. 6 shows an alternative fuel cell stack assembly with oxidant inlets located in the hood.

In a further embodiment (FIG. 6), a plurality of oxidant inlets 120 are provided in hood 50 rather than in base plate 40. This arrangement aids gas flow and distribution, particularly helping prevent stagnant areas of gas flow.

Figure 7:
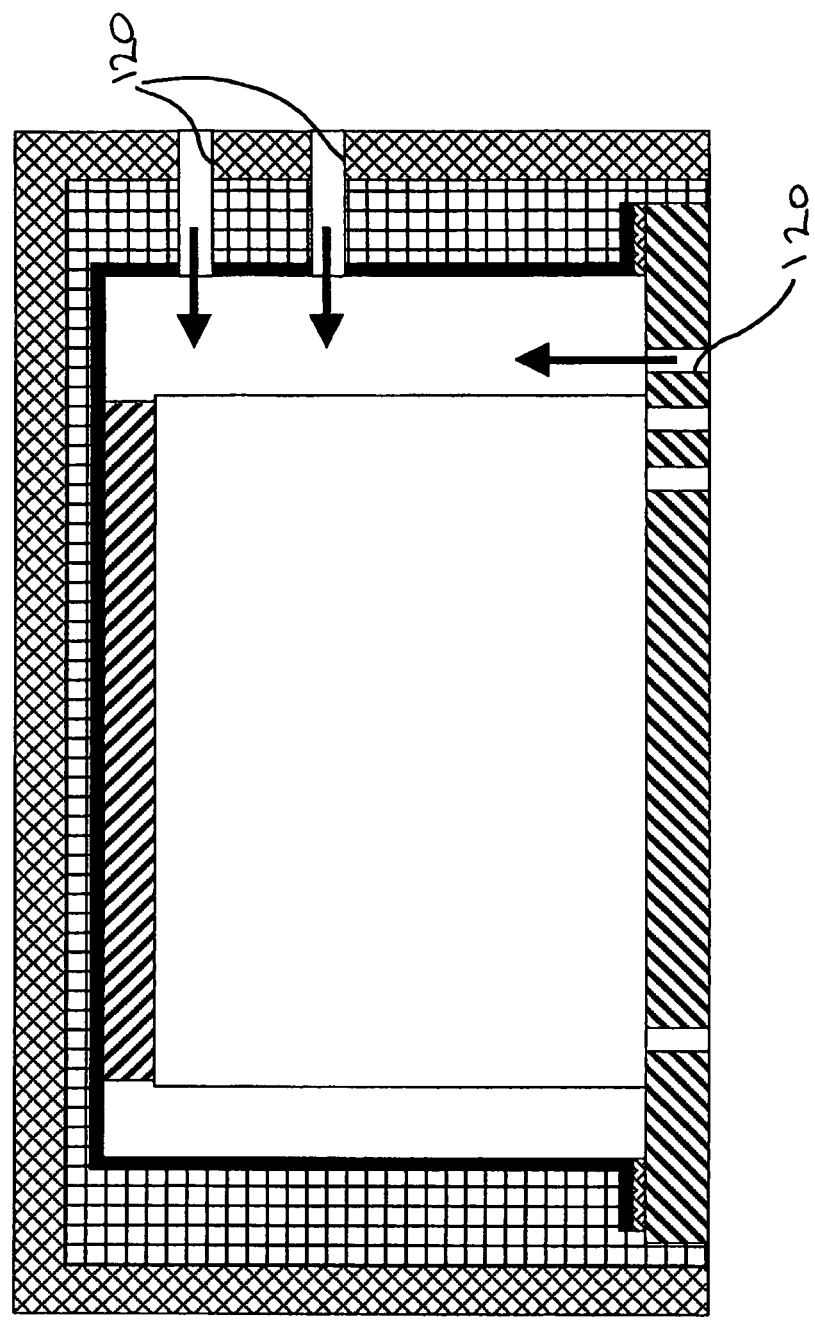
FIG. 7 shows an alternative fuel cell stack assembly with oxidant inlets located in the hood and the base plate.

In a further embodiment (FIG. 7), a plurality of oxidant inlets 120 are provided in hood 50 as well as in base plate 40, and again this is done to aid gas flow and distribution, particularly helping prevent stagnant areas of gas flow.

Figure 8:
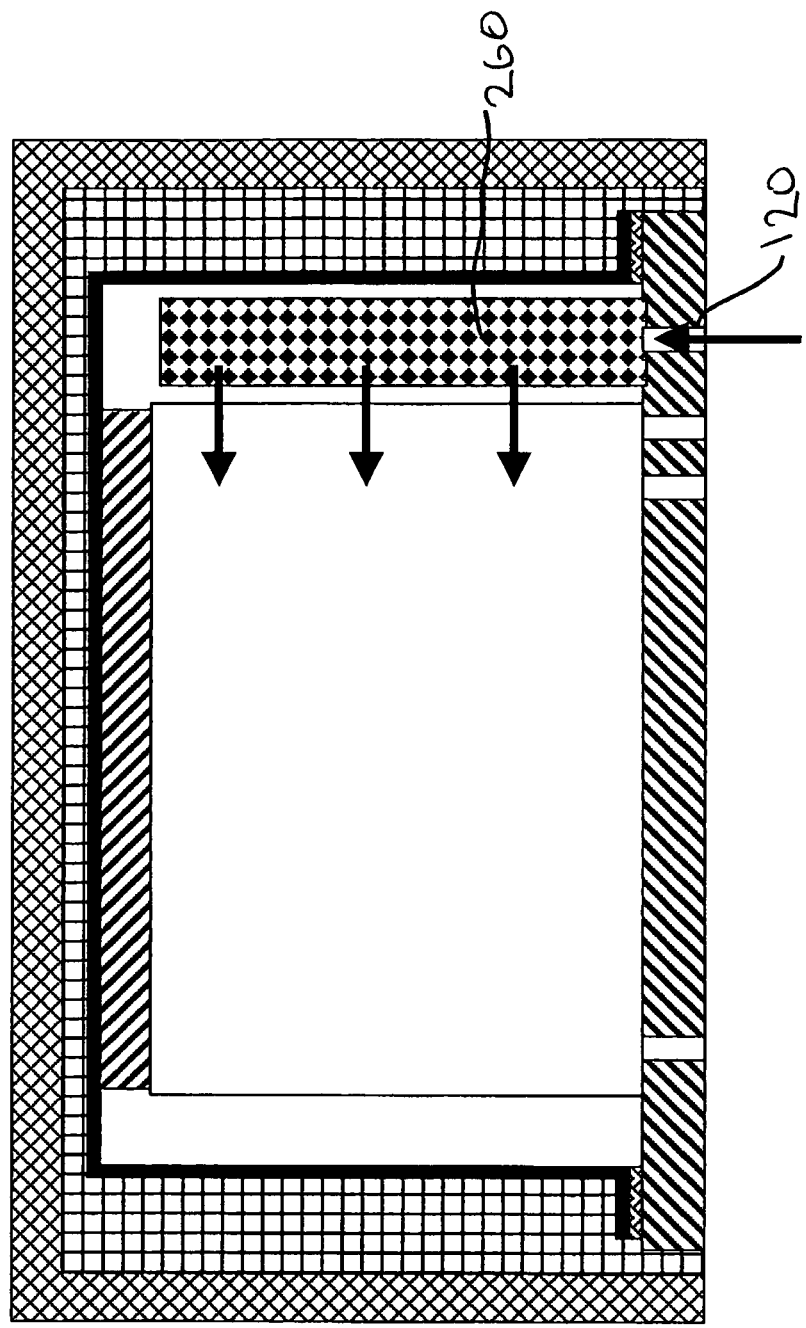
FIG. 8 shows an alternative fuel cell stack assembly with oxidant inlets located in the base plate and additionally comprising a flow distribution device.

In the embodiment of FIG. 8, a plurality of oxidant inlets 120 are provided in base plate 40, and a flow distribution device 260 is provided comprising a perforated metal tube, designed to aid gas flow distribution from inlets 120 throughout hood volume 60. in alternative embodiments (not shown) hood distribution device 260 comprises a highly porous ceramic material, and a formed section of hood 50.

It will be appreciated that it is not intended to limit the present invention to the above embodiments only, many other embodiments being readily apparent to a person of ordinary skill in the art without departing from the scope of the appended claims.

REFERENCE NUMERALS

1—fuel cell stack assembly
10—solid oxide fuel cell stack
20—fuel cell stack layer
21—additional fuel cell stack layers
30—fuel cell
31—fuel cell anode
32—fuel cell electrolyte
33—fuel cell cathode
34—fuel cell metal substrate
35—fuel cell substrate non-porous region
36—fuel cell substrate porous region
37—electrically conductive interconnect plate
38—electrically insulating gasket
40—base plate
50—hood
60—hood volume
70—open-manifolded oxidant inlet
80—open-manifold end
90—internally manifolded oxidant outlet
100—internally manifolded fuel inlet
110—internally manifolded fuel outlet
120—oxidant inlet
130—fuel
130a—exhaust fuel
130b—drier exhaust fuel
140—oxidant (air)
140a—exhaust oxidant
150—thermally insulating block
160—fuel cell stack end-plate
170—fuel cell stack external surface
190—hood interior surface
200—oxidant heat exchange system
230—gas sealing thermally insulating vermiculite gasket
240—inner insulating layer
250—outer insulating layer
260—flow distribution device
270—water
280—steam
290—gas to gas heat exchanger
300—condensing heat exchanger
310—tail gas burner
320—burner off-gas
330—steam reformer
340—steam generator
350—cooling fluid in
360—cooling fluid out

The invention claimed is:

1. An intermediate-temperature solid oxide fuel cell stack assembly comprising:
   (i) a base plate;
   (ii) a hood sealingly attached to said base plate and defining a hood volume between said base plate and said hood;
   (iii) at least one intermediate-temperature solid oxide fuel cell stack mounted upon said base plate and enclosed by said hood;
   (iv) at least one gas inlet into said hood volume; and
   (v) a pre-heater in fluid communication with an oxidant source and said at least one gas inlet and adapted to supply oxidant from said oxidant source to said hood volume via said gas inlet, each fuel cell stack comprising at least one fuel cell stack layer, each fuel cell stack layer comprising at least one intermediate-temperature solid oxide fuel cell, each fuel cell defining an oxidant inlet end and an exhaust oxidant outlet end, said at least one fuel cell stack having:
   (a) at least one open-manifolded gas inlet defining an open-manifold end of said at least one fuel cell stack; and
   (b) at least one internally manifolded gas outlet, said at least one gas inlet into said hood volume being located remote from said open-manifold end of said at least one fuel cell stack such that in-use oxidant enters said hood volume through said at least one gas inlet and passes around the outside of said at least one fuel cell stack to said at least one open-manifolded gas inlet, direct heat transfer occurring between said oxidant and the external surface of said at least one fuel cell stack layer prior to entry of said oxidant into said open-manifolded gas inlet, said pre-heater being configured such that in-use oxidant from said oxidant source is heated and supplied to said hood volume via said at least one gas inlet at a temperature not more than 100° C. below an in-use operating temperature at the inlet end of the fuel cell nearest the at least one open-manifolded gas inlet.

2. A fuel cell stack assembly according to claim 1, not comprising an inlet gas pre-heater located within said hood volume.

3. A fuel cell stack assembly according to claim 1, wherein said at least one intermediate-temperature solid oxide fuel cell stack is a metal-supported intermediate-temperature solid oxide fuel cell stack.

4. A fuel cell stack assembly according to claim 1, said at least one fuel cell stack additionally comprising at least one internally manifolded fuel inlet.

5. A fuel cell stack assembly according to claim 4, said at least one internally manifolded gas outlet being an internally manifolded exhaust fuel outlet, said fuel cell stack additionally comprising at least one internally manifolded exhaust oxidant outlet.

6. A fuel cell stack assembly according to claim 4, said at least one internally manifolded gas outlet comprising at least one internally manifolded mixed exhaust fuel and oxidant outlet.

7. A fuel cell stack assembly according to claim 1, the external surface of the at least one fuel cell stack layer additionally comprising at least one protrusion adapted to in-use effect heat transfer between it and the gas.

8. A fuel cell stack assembly according to claim 1, at least one of the internal surface of the hood and the external surface of the at least one fuel cell stack layer additionally comprising at least one protrusion adapted to in-use cause turbulent fluid flow.

9. A fuel cell stack assembly according to claim 1, wherein said fuel cell stack has an in-use operating temperature of 450-650° C.

10. A fuel cell stack assembly according to claim 1, wherein said at least one intermediate-temperature solid oxide fuel cell stack is metal-supported.

11. A fuel cell stack assembly comprising a fuel cell stack assembly according to claim 1, further comprising a fuel cell stack system assembly.

12. A method of operation of an intermediate-temperature solid oxide fuel cell stack assembly, said fuel cell stack assembly comprising:
(i) a base plate;
(ii) a hood sealingly attached to said base plate and defining a hood volume between said base plate and said hood;
(iii) at least one intermediate-temperature solid oxide fuel cell stack mounted upon said base plate and enclosed by said hood;
(iv) at least one gas inlet into said hood volume; and
(v) a pre-heater in fluid communication with an oxidant source and said at least one gas inlet and adapted to supply oxidant to said hood volume via said gas inlet,
each fuel cell stack comprising at least one fuel cell stack layer, each fuel cell stack layer comprising at least one intermediate-temperature solid oxide fuel cell, each fuel cell defining an oxidant inlet end and an exhaust oxidant outlet end said at least one fuel cell stack having:
(a) at least one open-manifolded gas inlet defining an open-manifold end of said at least one fuel cell stack; and
(b) at least one internally manifolded gas outlet, said at least one gas inlet into said hood volume being located remote from said open-manifold end of said at least one fuel cell stack,
comprising the steps of passing oxidant into said hood volume through said at least one gas inlet passing it around the outside of said at least one fuel cell stack to said at least one open-manifolded gas inlet, direct heat transfer occurring between said oxidant and the external surface of said at least one fuel cell stack layer prior to entry of said oxidant into said open-manifolded gas inlet, said pre-heater being configured such that in-use oxidant from said oxidant source is heated and supplied to said hood volume via said gas inlet at a temperature not greater than 100° C. below an in-use operating temperature at the inlet end of the fuel cell nearest the open-manifolded gas inlet.

13. A method according to claim 12, additionally comprising the step of performing an electrochemical reaction with oxidant and fuel upon said at least one intermediate-temperature solid oxide fuel cell to generate heat and electricity.

* * * * *

UNITED STATES PATENT AND TRADEMARK OFFICE
CERTIFICATE OF CORRECTION

PATENT NO. : 8,642,227 B2 Page 1 of 1
APPLICATION NO. : 12/528510
DATED : February 4, 2014
INVENTOR(S) : Harrington et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 933 days.

Signed and Sealed this
Twenty-ninth Day of September, 2015

Michelle K. Lee
*Director of the United States Patent and Trademark Office*